(12) United States Patent
Perlmutter et al.

(10) Patent No.: US 8,010,092 B2
(45) Date of Patent: Aug. 30, 2011

(54) SYSTEM FOR FACILITATING PARALLEL DATA TRANSFER FROM A WIRELESS CALLER INTO A COMMUNICATIONS CENTER

(75) Inventors: Michael Perlmutter, San Francisco, CA (US); Dan Kikinis, Saratoga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 1335 days.

(21) Appl. No.: 10/875,701

(22) Filed: Jun. 23, 2004

(65) Prior Publication Data

US 2005/0286492 A1     Dec. 29, 2005

(51) Int. Cl.
*H04M 3/42*  (2006.01)
(52) U.S. Cl. .................................. 455/415; 455/466
(58) Field of Classification Search ............... 370/395.3; 395/88.19–88.21, 93.03, 127.01, 142.01, 395/201.01; 455/415, 411, 412.1, 412.2, 455/445, 466, 550.1, 465, 566; 379/88.19–88.21, 379/93.03, 127.01, 201.01, 118, 120, 142.01–142.18, 379/183, 201.11, 207.13, 207.14, 207.15
See application file for complete search history.

(56) References Cited

U.S. PATENT DOCUMENTS

| | | | | |
|---|---|---|---|---|
| 4,972,457 A * | 11/1990 | O'Sullivan | ................. | 455/556.1 |
| 5,396,539 A * | 3/1995 | Slekys et al. | ................ | 455/426.1 |
| 6,188,751 B1 * | 2/2001 | Scherer | ....................... | 379/88.22 |
| 6,628,767 B1 * | 9/2003 | Wellner et al. | ........... | 379/202.01 |
| 6,633,756 B1 * | 10/2003 | Tett | ............................. | 455/412.1 |
| 6,680,935 B1 * | 1/2004 | Kung et al. | .................... | 370/352 |
| 6,775,360 B2 * | 8/2004 | Davidson et al. | .......... | 379/88.14 |
| 6,917,917 B1 * | 7/2005 | Kim | ............................... | 704/235 |
| 7,136,478 B1 * | 11/2006 | Brand et al. | ............. | 379/265.09 |
| 7,317,696 B2 * | 1/2008 | Preston et al. | ................. | 370/310 |
| 7,496,189 B2 * | 2/2009 | Clarisse et al. | .......... | 379/207.15 |
| 2002/0037076 A1 * | 3/2002 | Perlmutter | ..................... | 379/219 |
| 2002/0055350 A1 * | 5/2002 | Gupte et al. | .................. | 455/412 |
| 2002/0128033 A1 * | 9/2002 | Burgess | ......................... | 455/528 |

(Continued)

FOREIGN PATENT DOCUMENTS

EP    0 647 075 A    4/1995

(Continued)

OTHER PUBLICATIONS

Peersman G et al., The Integration of SMS with Voice Based Technology, IEEE Seminar Digests 1997, Jun. 12, 1997, pp. 1-9, XP006509969, IEE, London, UK.

*Primary Examiner* — Fan Tsang
*Assistant Examiner* — Akelaw A Teshale
(74) *Attorney, Agent, or Firm* — Donald R. Boys; Central Coast Patent Agency, Inc (57) ABSTRACT

A system for identifying and interacting with callers has: a telephone switch for receiving and distributing incoming calls; a messaging server for sending or receiving messages and attachments; and, a software routine for identifying wireless callers and for matching them to messages in the messaging server. The system is characterized in that upon receiving a call the system attempts to identify the call to a caller and of the caller is not already known in the system or identified an automated message is generated and sent to the caller asking for the desired information. In one embodiment the caller sends a message when the call is placed to optimize identification.

26 Claims, 3 Drawing Sheets

U.S. PATENT DOCUMENTS

| | | |
|---|---|---|
| 2003/0040325 A1 | 2/2003 | Clark |
| 2003/0054842 A1* | 3/2003 | Riedl et al. .................. 455/462 |
| 2003/0092432 A1 | 5/2003 | Hwang |
| 2003/0104812 A1 | 6/2003 | Easley |
| 2005/0020236 A1* | 1/2005 | Mauney et al. ............. 455/403 |
| 2006/0098800 A1* | 5/2006 | Pelletier et al. ............. 379/230 |

FOREIGN PATENT DOCUMENTS

| | | |
|---|---|---|
| EP | 1 104 206 A | 5/2001 |
| WO | WO 99/12365 A | 3/1999 |
| WO | WO 02/091717 A | 11/2002 |
| WO | WO 2004/102936 A | 11/2004 |

\* cited by examiner

SYSTEM FOR FACILITATING PARALLEL DATA TRANSFER FROM A WIRELESS CALLER INTO A COMMUNICATIONS CENTER

FIELD OF THE INVENTION

The present invention is in the field of telephony communications, including public-switched telephony communications, Internet protocol telephony communications, and cellular telephony communications. The invention pertains particularly to a system for facilitating parallel data transfer into a communications center from a wireless caller.

BACKGROUND OF THE INVENTION

In the field of telephony services communications centers also termed call-in centers are used by enterprises to service clients. An example of such a center might be a technical support group of a computer manufacturer where clients call in to gain technical assistance.

State-of-art communications centers have connection to the well-known public-switched-telephony-network (PSTN) for receiving connection-oriented-switched-telephony (COST) calls. These centers also often have connection to the well-known Internet network, and perhaps connection to a variety of wireless telephone networks.

In communication networks of today, calls handled between major communications carriers may be exchanged digitally, either as COST calls, or in some newer cases, as voice over Internet protocol (VoIP) or Internet protocol network telephony (IPNT), also termed data network telephony (DNT).

One with skill in the art of modern telecommunications will appreciate that calls sourcing from anywhere in network or sub-network may be routed in between networks and connected to a destination in a network or sub-network in a seamless fashion as a dedicated connection or as a shared-bandwidth connection.

In communications center architecture known to the inventor, telephone calls into the center may, in some cases, be intercepted at the network level and routed to individual agents within the center along with data about the call and caller. This may be accomplished by providing a separate data network accessible to the communications center and accessible to the local switch handling calls for the center. For example, a computer-telephony-integration (CTI) processor may be connected to the local telephony switch handling calls for the center. Interactive-voice-response (IVR) technology may also be provided to interact with a caller at the point of the switch to identify the caller and determine the purpose for the call.

Within the communications center, a central office switch may also be enhanced with a CTI processor. The two CTI processors, one at network level, and one within the center, may be linked together via a separate data network. Using this technique, calls may be routed at the level of the network and data about the call and caller can be forwarded to an agent ahead of the actual call. Assuming the call is a PSTN incoming call, the target agent (the agent the call is routed to) can have data about the call and caller may appear on a computer display screen perhaps seconds before he or she answers the call.

While this technology greatly enhances customer service for callers, it requires interaction with each caller via IVR or equivalent technologies and the supporting data network set-up between network level switches and the communications center. Moreover, if the caller is calling from a wireless network the amount of time translating the IVR interface and navigating a long menu or series of voice prompts may consume valuable minutes. Likewise, a wireless caller may have call blocking services wherein standard techniques for determining a source number for a call are not successful in revealing the caller's telephone number. In many of these cases, the only reference a destination has as to the ID of a caller is a virtual telephone number of a particular telephone carrier.

What is clearly needed is a system and method for acquiring caller ID of a wireless caller without tying up the caller with lengthy pre-connect interaction before routing while still enabling agent access to ID and additional data about the caller.

SUMMARY OF THE INVENTION

A system is provided for identifying and interacting with callers including a telephone switch for receiving and distributing incoming calls; a messaging server for sending or receiving messages and attachments; and, a software routine for identifying wireless callers and for matching them to messages in the messaging server. In preferred embodiments, the telephone switch is one of a private branch exchange or an automated call distributor. Also in a preferred embodiment, the messaging server generates and serves automated SMS messages.

In one embodiment, the messaging server generates and serves automated e-mail messages, session initiated protocol (SIP) messages, or PCS-email messages. In one embodiment, the messaging server and the software routine execute on a single machine and the machine is one of an agent workstation or a telephony switch. In an alternate embodiment of the invention, the telephone switch is connected at network level to another telephone switch using a data network separate from the telephone line.

In one aspect, the software routine is distributed to the switch. Also in one embodiment, the software routine is called only to interact with wireless callers identified by the system.

According to another aspect of the present invention, a software routine integrated with a CTI routine is provided for determining the existence of knowledge about a caller associated with an incoming call from the point of a communications center and includes, a first sub-routine for determining if a caller identification is known to the system; and, a second sub-routine for controlling an automated messaging server to interact with the caller.

In this aspect of the invention the CTI routine determines the number identity of the incoming call and if the call is from a wireless caller. In one embodiment, the software routine is integrated with the CTI routine resident on a CTI processor. In a variation to this embodiment, the software routine is integrated with a CTI routine resident on a server having access to a CTI processor. In one aspect of the embodiment, the software routine of further includes a sub-routine or determining whether a call is from a wireless caller or not. In still another variation the software routine is integrated with IP routing software.

According to another aspect of the invention, a method for interacting with a caller at a point of access to a communications center is provides and includes steps for (a) receiving an incoming call; (b) determining caller identification; (c) determining if existing data is available about the identified caller; (d) if data exists, retrieving the data associated with the identified caller; and (e) routing the retrieved data along with the call.

In one embodiment, in step (a), the point of access is a local telephony switch in a telephone network. In another embodiment, the point of access is a central switch in a communications center. In still another embodiment the point of access is a web server. In one aspect of the method in step (b), determining caller identification is performed by a CTI software routine.

In one embodiment, in step (b), if identification cannot be determined, an automated message is generated and sent to the caller during the session, the message asking for caller identification. In this aspect, the automated message is one of an SMS message, an SIP message, a PCS mail, or an e-mail message.

In one aspect of the method, in step (c) a database is searched based on the caller identification. In this aspect, if no data is found, an automated message is generated and sent to the caller, the message asking for input data. In still another aspect in step (d) the data is retrieved by an IP routing software routine.

In one aspect, in step (e) the data is pushed from the database to the target of routing. Alternatively, the data is pulled by the routing target, the target using a key previously generated and sent to the caller, the key subsequently sent to the routing target during the time of the call.

In one aspect, in step (d) the data is an SMS message including any attachments queued in an agent station having connection with the caller, a caller providing the telephone number during interaction which is then used to access the message from queue.

DESCRIPTION OF THE PREFERRED EMBODIMENTS

Figure 1:
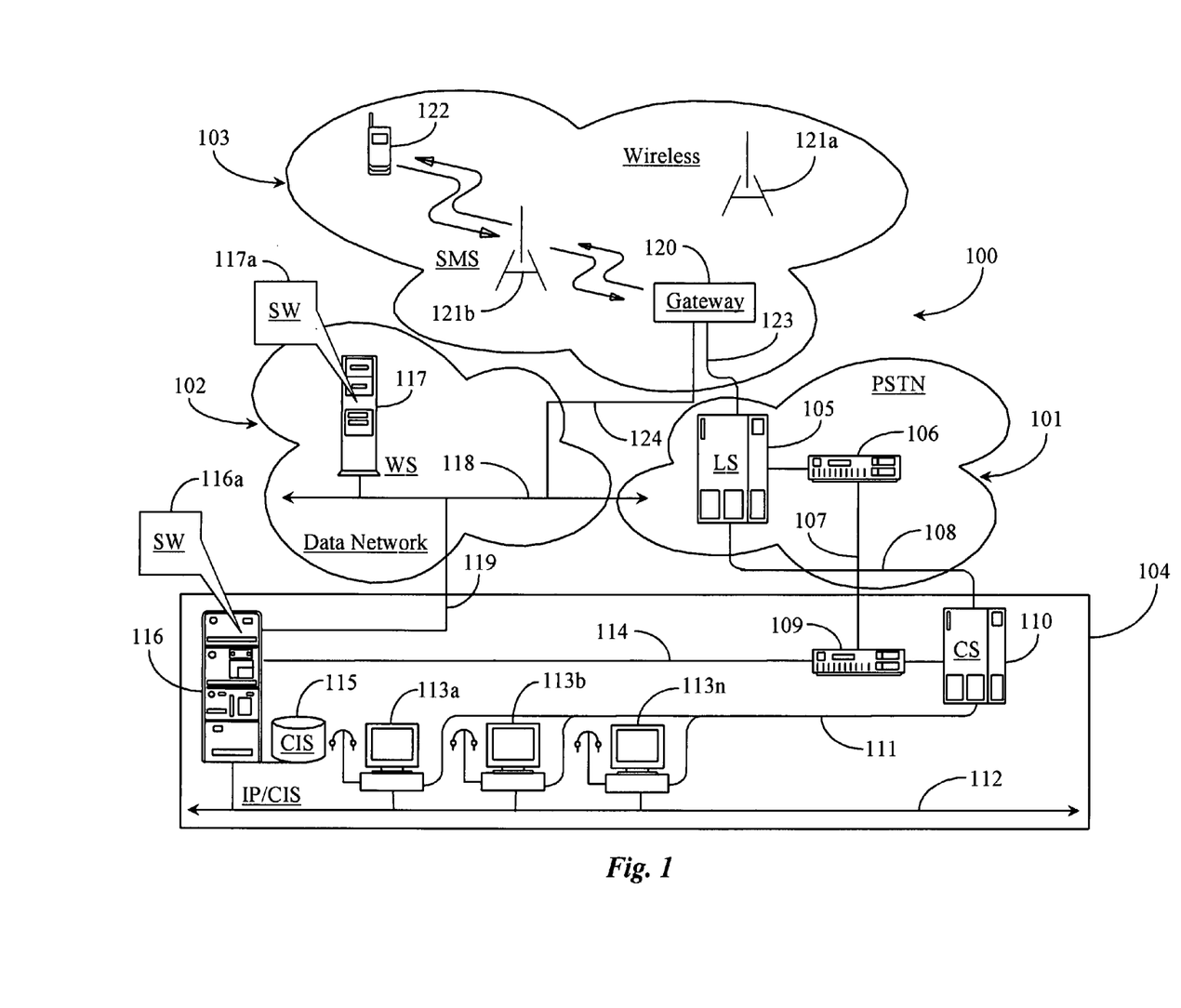
FIG. 1 is an architectural overview of a communications network practicing parallel data transfer into a communications center according to an embodiment of the present invention.

FIG. 1 is architectural overview of a communications network 100 practicing parallel data transfer into a communications center 104 according to an embodiment of the present invention. Communications network 100 includes a public-switched-telephone-network (PSTN), a Data network 102, and a wireless telephony and data network 103. PSTN network 101 includes a local telephony switch (LS) 105, and may also include, in one embodiment, a computer-telephony-integration (CTI) processor 106. LS 105 may be an automatic call distributor (ACD), a public branch exchange (PBX), or any other suitable call switch. It is noted herein, that computer-telephony-integration is not required to practice the present invention.

CTI processor 106 is, in this example, connected to LS 105 via a CTI link. CTI processor 106 provides intelligent enhancement to switch 105, which may include call-routing intelligence. In one embodiment, no CTI processor is present. Also in one embodiment, CTI functionality may be included within a telephone switch such as LS 105, which may be an ACD-type switch. Moreover, in cases of DNT, no CTI processor is required. In a most simple embodiment, ergo in most basic cases, simple caller ID (telephone number) may be used to link a call and a short message service (SMS) message or e-mail containing the telephone number in the header entirely in the agents PC. The inventor illustrates CTI functionality only as one possible embodiment that is available for interacting with callers.

Data network 102 may be an Internet network, an intranet network, or another type of data network such as a private or corporate data network without departing from the spirit and scope of the present invention. In a preferred embodiment however the Internet network is exemplified because of its public-access characteristics. Hereinafter data network 100 and to may be referred to herein as Internet network 102. Internet network 102 in this example includes an Internet backbone 118. Internet backbone 118 represents lines, connection points, and equipment that make up the Internet network as a whole. A Web-server 117 is illustrated within Internet 102 and is connected to backbone 118. Web server 117 is adapted to serve electronic information pages to clients of communications center 104 and might be a client access point, in one embodiment, so that clients may access communications center 104. Although not illustrated in this embodiment, Internet 102 may have connection to PSTN 101 through a Bell core (SS-7) translation gateway or other translation gateway.

LS 105 within PSTN 101 and WS 117 within Internet 102 have connection to a wireless gateway 120 within a wireless network 103 by way of trunks 123 and 124 respectively. Gateway 103 may be hosted by any wireless carrier providing services to wireless callers. Within a wireless network 103 two wireless towers are illustrated, 121a and 121b. A client of wireless network 103 is illustrated by a wireless handset 122. In this example client 122 is negotiating with gateway 120 or wireless tower 121b. Wireless network 103 may be a cellular data network, a WIFI network or another type of wireless communications network.

One with skill in the art of network communications will appreciate that more than one wireless gateway may be provided, and that dedicated processors may similarly be provided and may be used to handle data and calls or call data (in case of VoIP call delivery) separately. Also, rather than or additionally to WS 117, a soft switch (not shown) may be present in the call center site to handle incoming VoIP calls. Links may be dedicated as shown (typical for SMS), or shared or by the way of public Internet (typical for e-mail or PCS mail), Inter Exchange Carriers etc.

A communications center 104, sometimes termed a call center, is illustrated in this example and is connected to both the PSTN 101 and to Internet 102. A central office switch (CS) 110 is provided within communications center 104 and is connected to LS 105 within PSTN 101 by a telephony trunk 108. CS 110 may be a PBX or another type of telephony switch. A CTI processor 109, although not required, is provided in this example and is connected by a CTI link to CS 110. Processor 109 has connection in this example with processor 106 within PSTN 101 by way of a separate data network 107. Processor 109 enables intelligent routing routines and other client-interaction routines to be executed within PSTN 101 at the point of LS 105.

Communications center 104 is equipped with a local-area-network (LAN) 112. LAN 112 connects to workstations 113a, 113b, and 113n for communication and routing of messages and calls. Workstations 113a-n typically include computer and monitor capabilities, and capabilities for answering both IP and PSTN telephone calls within communications center 104. In this example, telephones in workstations 113*a-n* may be connected to CS 110 by way of internal telephone wiring 111.

An Internet protocol/customer information system (CIS) server 116 is provided within communications center 104 and is connected to LAN 112. Server 116, among many other tasks, is adapted, in one embodiment, as an IP router capable of receiving IP communications from Internet 102 over data link 119. Server 116 has a data connection 114 to CTI processor 109. When a PSTN call is received at CS 110, data about the call and caller is received at processor 109 and can be routed over LAN 112 to an appropriate workstation through link 114 and IP server 116. Server 116 is also responsible, in this example, for serving customer and product information to agents operating workstations 113*a-n*. A customer information system database (CIS) 115 is provided for the purpose of storing customer information, identification, account information, and so on. In this example CIS 115 has direct connection to server 116.

In one embodiment of the present invention, the functions of server 116 may be represented by a plurality of machines connected to LAN 112 instead of just one machine without departing from the spirit and scope of the present invention. In this example, the functions of IP routing, parallel data transfer, information serving, and automated messaging are all performed on machine 116.

In typical application with regard to normal client traffic within communications center 104, PSTN callers access communications center 104 through LS 105, and Internet caller's access communications center 104 through web server 117. At the point of LS 105, PSTN callers can be identified in typical telephony number identification protocols such as automated number identification (ANI) and destination number identification service (DNIS). In addition to caller identification, caller interaction is typically provided using IVR technology or some other intelligent peripheral. For each PSTN call incoming into switch 105 and destined for center 104, the actual call is routed over telephony trunk 100 to CS 110 while the data about the call may be routed from processor 106 to processor 109 if, as in this case, CTI functionality is provided. Internet callers using messaging or IP telephony conventions access communications center 104 through web server 117 as previously described. IP calls, messages and data (forms and attachments) may be transmitted to IP server 116 over Internet link 119.

Client 122 calling into center 104 from network 103 may access, in some embodiments, either LS 105 or WS 117 in order to communicate with communications center 104 as long as the client is Internet-enabled. If client 122 accesses LS 105 and reaches an agent within communications center 104, he or she will receive the same basic identification and interaction services as PSTN callers. However, mobile clients are not as easy to identify as tethered clients are. As was described further above, mobile callers often have blocked telephone numbers and may therefore, not be successfully identified at a point of interaction. Moreover, mobile clients may be roaming and therefore may be paying a higher price for communication with center 104. Therefore, a mobile client may not wish to sit through a long IVR interaction before being routed to an available agent within communications center 104. With respect to WS 117, if client 122 has an IP telephony application and e-mail or instant message capabilities, he or she may connect to an available agent through Internet 102 bypassing PSTN 101 altogether. Still client 122 may have to pay for the wireless carrier portion of the access.

In a preferred embodiment of the present invention, an instance of software (SW 116*a*) is provided to server 116 and is adapted to assist communications center 104 in identifying wireless callers and, if necessary, enabling a different mode of parallel data transfer from a wireless caller to a target agent within communications center 104. SW 116*a* is adapted to interact with the wireless caller attempting to connect to communications center 104 through LS 105 or through WS 117. In one embodiment of the present invention a version of SW 116*a* is provided on WS 117 as an instance of SW 117*a*. In the latter case or WS 117 would be hosted by communications center 104 and would be a dedicated client access server.

In one embodiment of the present invention routine 116*a*, including version 117*a*, can be used as an interaction option for land-based callers sourced from PSTN 101 or from Internet 102. Such an option could be used to replace the IVR interaction option. The system may, however, be configured solely for wireless callers identified by the system because of the special problems wireless callers have with standard interaction services geared more for tethered callers. The system may identify wireless callers based on the difference in telephone number geographic prefix, or by deducing the routing path leading back to an identifiable wireless carrier node or service.

In one embodiment where CTI software is available, CTI software is adapted to determine if an incoming call has been routed through or is being carried by a wireless service before calling routine 116*a*. If not, normal IVR interaction and solicitation of additional data through IVR methods may be practiced according to technology known to the inventor.

Software 116*a* provides intelligence to LS 105 within PSTN 101 by way of a separate data network link 114, processor 109, link 107 and processor 106. The intelligence comprises a routine for acquiring the identification of a wireless caller and in the event the caller is not known to the system, acquiring further information from the caller in a fashion that is convenient to the caller. Software 117*a* is adapted to provide essentially the same intelligence routine versioned for wireless access protocol (WAP), or other HTTP-related wireless protocols.

In practice of the present invention, client 122 may access gateway 120 through tower 121*b* and be ported into the PSTN network 101 over link 123 to switch 105. LS 105 is provided with software-enabled intelligence to discern wireless callers from tethered callers. Tethered callers receive the typical IVR solution whereas a special routine is selected for wireless callers. If in practice, the wireless caller is already known to the system (having an identity and sufficient data stored) then no interaction is specifically required, and the caller may be immediately routed from switch 105 to switch 110 and an available agent over wiring 111. In this embodiment, the caller may have an associated digital key, which may be used, by communications center 104 to access data about the identified caller from CIS 115 while the call is being routed.

In one embodiment of the present invention, a wireless caller is not identifiable at the point of interaction in terms of caller ID (telephone number). In this case, the caller may simply send a short SMS message to the same destination number used to place the call. In this case, the SMS message provides the caller identification. The advantage of using SMS, unlike e-mail or some other messaging protocols is that it cannot be spoofed and therefore provides some authenticity that the number identified is actually that of the wireless caller.

In one embodiment of the present invention identification of the caller is not specifically known to the system other than knowledge of the client's telephone number, which may also, as described above, in some cases not be available to the system. In a case where a caller's number may be identified but further information is not known, SW 116*a* may generate a short message service (SMS) request adapted for the purpose of obtaining additional identification and call-purpose information from the client sufficient so that the system can use to service the client. Such further identification and information may include, in some embodiments, data that is already stored on the client's device (122) that may be triggered for send when a SMS is received from the system. In other embodiments client 122 may receive an SMS from communications center 104 including a simple electronic form with which to add data to for a SMS reply to center 104. Such a reply may include client identification and additional data required to enable the center to better serve the client.

In a PSTN embodiment, the SMS path extends from client 122 through the network architecture to IP server 116. In this case IP server 116 generates the automated SMS messages. However, software 116*a* may reside in either processors 109 or processor 106, if CTI is present, including automated message capabilities. In one embodiment software 116*a* may reside in either CS 110 or in LS 105 or both. In some embodiments of the invention other types of messaging can be used in place of SMS such as e-mail, instant message, or session initiated protocol (SIP) messaging. In a preferred embodiment SMS messaging is used because it already identifies the client by telephone number and can be sent over the same data paths as the telephone call is self.

In one embodiment of the present invention, the SMS path takes Route 124 through Internet 102 over link 119 to server 116 while the caller is waiting at switch 105. When the system completes the routine and identifies the caller and any additional data required, the call may then be routed from LS 105 to CS 110 for distribution to one of workstations 113 *a-n*.

In one embodiment of the invention an SMS path extends from client 122 through gateway 120 over link 124 and backbone 118, to WS 117. In this case, IP routing over LAN 112 to one of agents 113*a-n* includes data from CIS 115 and the actual IP call or live message. More detail about interaction capabilities of SW 116 is provided later in the specification.

In yet another embodiment of the present invention, calls from wireless callers may be matched up with SMS or other messages by simply using caller ID (telephone number) either directly provided or solicited from the client at the agent station to pull SMS or other messages from a message queue, wherein the message header contains at least one element with the number of the caller (i.e. 14085551212@carrier-pcs.net), typically its address or SMS header.

It will be apparent one with skill in the art that the system of the present invention can be implemented in conjunction with a PSTN or other telephone network, the Internet, an Intranet, or a corporate wide-area-network (WAN), accessible from a variety of wireless network carriers. It will also be apparent one with skill in the art that the functions of server 116*a* may be distributed to a variety of machines without departing from the spirit and scope of the present invention. Likewise, software 116 may be distributed in parts to various machines such as processors 109, 106, gateway 120, and WS 117.

Figure 2:
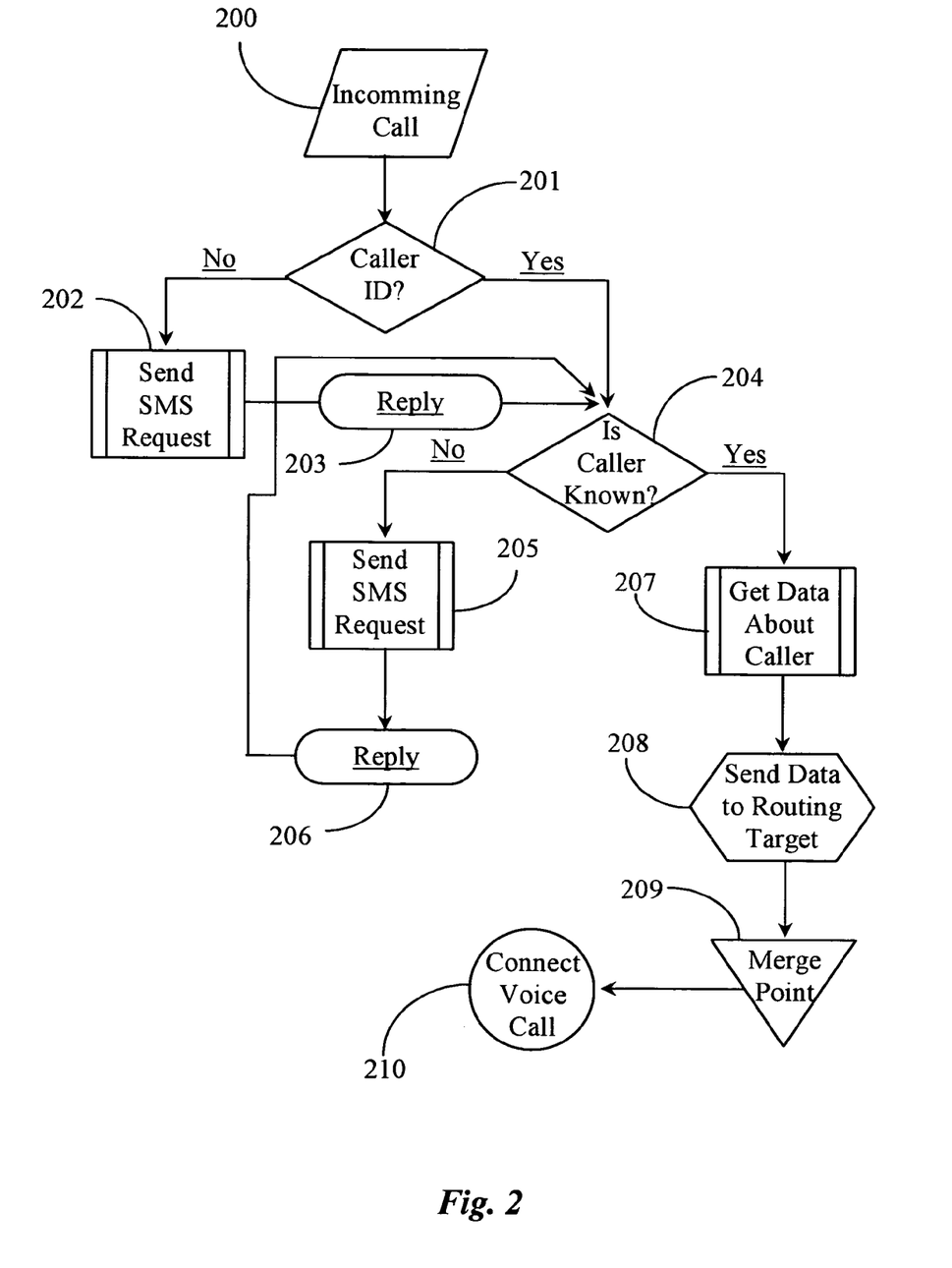
FIG. 2 is a process flowchart illustrating steps for acquiring data for parallel transfer into the communications center according to an embodiment of the present invention.

FIG. 2 is a process flowchart illustrating steps for acquiring data for parallel transfer into the communications center according to an embodiment of the present invention. With respect to the embodiment described above, a method is provided and enabled by software 116*a* for verifying identification of wireless callers and, if necessary, acquiring additional data and having the data flow into the communications center in a parallel manner with the routed call.

It is important to note herein that the process flow of this example may vary substantially without departing from the spirit and scope of the present invention. For example, a wireless caller may send an SMS message or other message in sync with a telephone call. The call can be routed according to destination number. The message may also be routed according to destination number. Interaction with the caller at the time of the call may then be used to solicit a caller's number, which may then be used to pull the message from a queue on the same station. The inventor provides the following example has just one possible example of routine flow.

At step 200, a local switch analogous to LS 105 in the embodiment described above receives an incoming call destined for a communications center analogous to center 104 of the same embodiment. Typically, the incoming call is bridged to a gateway such as gateway 120 also described with reference to FIG. 1 above.

At step 201, the software determines if there is a caller ID accompanying the call. Typically, the caller ID would be a caller's cellular telephone number. If at step 201, if there is no caller identification for the incoming call, then at step 202, an automated SMS request is sent to the caller asking for identification such as a telephone number, or some other piece of identification that the system can use. In this case because there is no telephone number identifying the caller, the SMS message would be sent in real time over the same dedicated path used by the caller.

In one embodiment, at step 200 interaction between and IVR or other automated is used to solicit the caller's telephone number. Moreover, in addition to SMS, e-mail, I am, or PCS-mail may be used instead in light of today's communications devices typically supporting a variety of messaging systems and protocols.

At step 203 the caller sends a SMS reply revealing the telephone number or other piece of identification to identify the caller. In one embodiment of the present invention, the caller, upon receiving an SMS request for identity, is configured to automatically send an SMS reply containing a customer information services (CIS) key that can be used by the system to access the caller's data.

If the incoming call of step 200 already has identification at step 201, then at step 204 the system performs a lookup in a customer information system database such as CIS 115 of FIG. 1 to determine if the caller is known to the system, such as having done business with the enterprise previously. The lookup task can be ordered from the distributed version of software local to the client access hardware and can be performed from within communications center 104 such as by server 116.

At step 204, if the caller is not known even after caller ID has been provided, an automated SMS request is sent to the caller at step 205. This SMS request may ask for additional information such as a stated purpose of the call, a preferred routing destination, or other information to help the center further process routing of the call. In one embodiment of the invention, the SMS sent at step 205 may include a Java applet or link that executes or loads at the client's end as a displayable, electronic form. The applet can source from server 116, processors 109 or 106, or from gateway 120 if enabled.

According to another embodiment of the present invention instead of an SMS request for additional data, an e-mail, instant message, or SIP request may be sent instead. The latter case assumes that the wireless client analogous to client 122 can utilize voice and Internet access simultaneously.

After receiving the SMS request at step 205 the client may provide the required data in an SMS reply at step 206. After receiving data supplied by the client, the system again determines at step 204 if the caller is known. Presumably, after step 206 the system receiving the data about the caller may input such data into the current CIS database. At step 204, if the caller is known to the system, then at step 207 the system may get data about the caller. The data may be retrieved from a CIS database such as CIS 115 of FIG. 1.

Once the appropriate client data is gathered, it is sent at step 208 to the routing target of the call, typically an agent or automated service provided by the center. In the case of agent workstations 113a-n of FIG. 1, an agent would pick up the call from CIS 110 and would already have the data displayed on his or her computer monitor. At step 209 the actual call and data are merged at a merge point, presumably on the agent's computer, such that the data is physically associated with the caller at the time the call is answered.

Once the call and data arrive at the routing target, the target may connect the voice call at step 210. Wireless callers accessing communications center 104 through Internet 102 and web server 117 may also experience short messages being sent from communications center 104 in an attempt to acquire additional data. However, in this case the data may be merged as it travels over the same path and is eventually routed to the same terminal or target routing point.

One with skill in the art will recognize that the process in this example may utilize a differing number or order of steps without departing from the spirit and scope of the present invention. For example, an SMS request sent at step 202 might request both identification and the additional data required in order successfully route the call thereby eliminating steps 205 and 206. In another embodiment, instead of polling data at step 207 or sending data in step 208, agents may subscribe to caller CIS keys such that when a caller sends a key the agent may use the key to pull the appropriate data about the caller. In a variation of this embodiment, a CIS key may be retrieved from the caller and used to unlock data in a CIS system, wherein the system pushes data to the appropriate agent. There are many possibilities.

Figure 3:
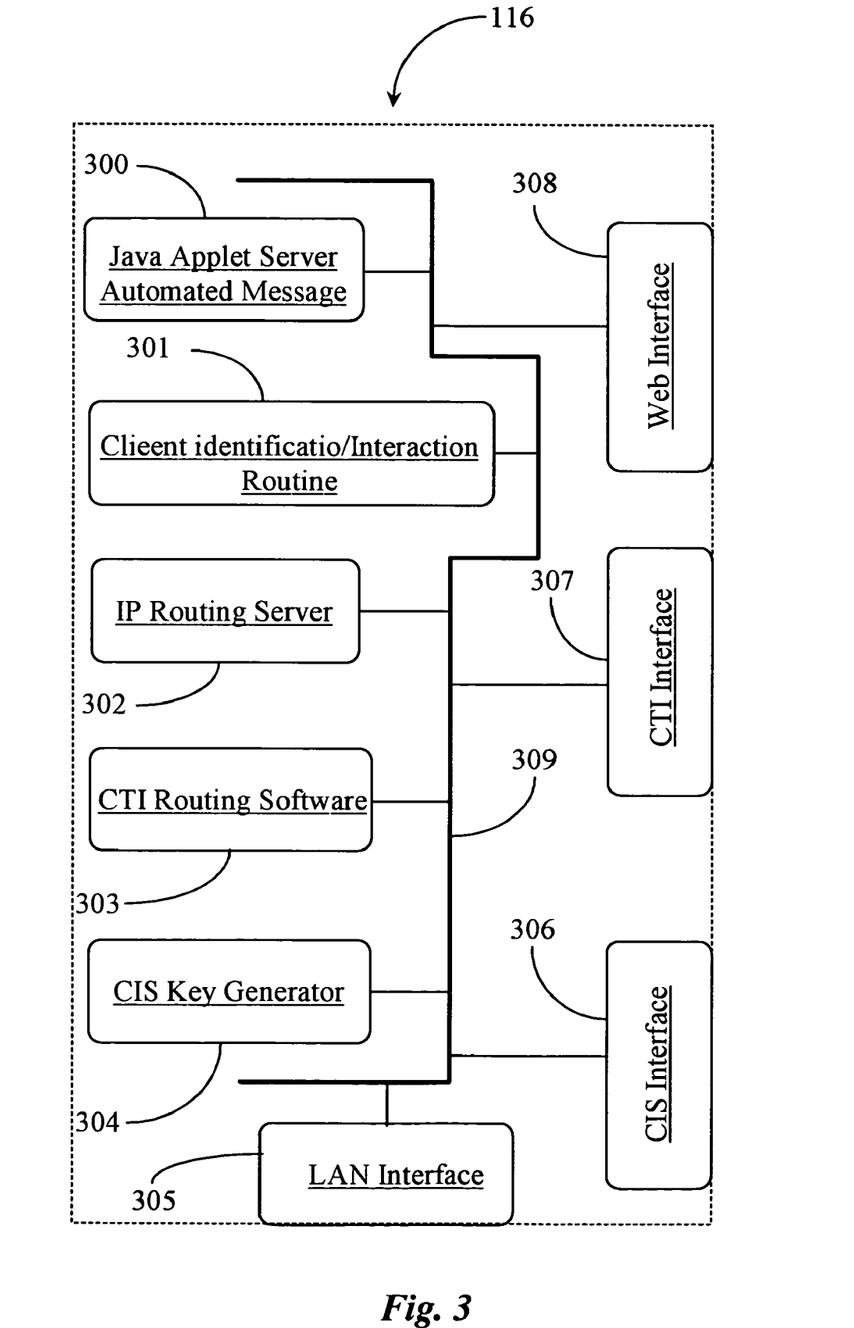
FIG. 3 is a block diagrams illustrating components of an IP/CIS server according to an embodiment of the present invention.

FIG. 3 is a block diagram illustrating components of IP/CIS server 116 of FIG. 1 according to an embodiment of the present invention. Server 116 has a number of interfaces to outside systems in this example. These are a LAN interface 305, a CIS interface 306, a CTI interface 307, and a Web interface 308. In a preferred embodiment server 116 has a server bus illustrated logically herein as a bus structure 309. Logical bus 309 connects all of the components with server 116 for communication internally as well as through interfaces 300 through 308.

Server 116 has a client identification/interaction routine 301, which is analogous to software 116a described with reference to FIG. 1. Server 116 also has a Java applet server 300, which is also capable of serving automated messages upon command. In a preferred embodiment of the present invention, component 301 interacts with Java applet server and automated messenger 300 according to switch notification of incoming wireless calls. Notification of incoming wireless calls is received through CTI interface 307. When an incoming call is present in the system component 301 launches the routine described with respect to FIG. 2 described above. Component 301 cooperates with component 300 to (if required) enable an automated SMS or other type of message including, possibly, a Java Applet carrying a form to better facilitate client provision of data.

Server 116 has an instance of IP routing server 302 provided therein and adapted for routing incoming IP communications through LAN interface 305 two available agents. IP routing server 302 is also responsible, in one embodiment, for accessing data through CIS interface 306 and routing the data through LAN interface 305 two available agents in conjunction with incoming PSTN calls.

Server 116 has a CTI routing software instance 303 adapted to communicate through CTI interface 307 two external CTI processors. Instance 303 may provide routing intelligence and exchange data with a local CTI processor connected to a local telephony switch as was described with respect to the architecture of FIG. 1.

According to one embodiment of the present invention, server 116 has a CIS key generator 304 adapted to generate CIS keys for wireless callers, which may be stored on virtually in a cellular telephone. In this embodiment, client identification/interaction routine 301 may be used to retrieve a CIS key for wireless caller for use by server 116 in accessing the client's data. In this example server 116 provides all of the functionality of the present invention in terms of identification and parallel data transfer internally to available agents operating on a LAN. IP routing server 302 and CTI routing software 303 cooperate to insure that the correct data about a client is routed over the LAN to the agent that will receive the telephone call. This may be accomplished using any number of tagging means such as by providing the client identification number or code both to the call and to the additional routed data. In one embodiment, a lightweight client may be distributed to agent workstations, and the light client may function as a merge point for queued calls and associated data arriving at the workstations.

It will be apparent one with skill in the art that the methods and apparatus of the present invention may be used in conjunction with any type of communications center whether it is CTI-enabled or void of CTI functionality and can receive and route data according to data packet or data frame technology. Such a communications center need not be a large communications center, but can be any type of enterprise center that minimally utilizes a call distributor and, in some embodiments, an IP router on an internal data network.

The methods and apparatus of the present invention can be applied in a variety of communication environments and architectures and should therefore be provided the broadest scope under examination. The spirit and scope of the present invention should be limited only by the claims, which follow.

What is claimed is:

1. A system for managing a cellular telephone call, comprising:
a server receiving the cellular telephone call in a voice-carrying protocol over a first data path from a caller using a cellular telephony appliance; and
software executing on the server processing and routing the call;
wherein the server, routing the call, sends the voice-carrying protocol data of the call and one or more text message protocol messages to the routing destination in a second data path, the text message identifying the caller and sending information about one or both of the call or the caller; and in an instance there is no identification for the caller received with the call at the server, sends a text message protocol message to the cellular telephony appliance in the first data path requesting identification data and includes any received identification data with the voice-carrying protocol data on the second data path.

2. The system of claim 1 wherein the text messages are sent in one of Short Message Service (SMS), email, Instant Messaging (IM) service, or Session Initiation Protocol (SIP).

3. The system of claim 1 wherein the server, receiving the cellular telephone call, also receives a text message in a text message protocol in the first data path with voice data in the voice-carrying protocol from the caller identifying the caller and including information about one or both of the call or the caller.

4. The system of claim 3 wherein the text message is a SMS message.

5. The system of claim 3 wherein the server routes both the call and data about the call or the caller to a destination, the data in a text message protocol other than the voice-carrying protocol, and the call and the message are associated.

6. The system of claim 5 wherein the message protocol is one of Short Message Service (SMS), email, Instant Messaging (IM) service, or Session Initiation Protocol (SIP).

7. The system of claim 1 wherein the server, receiving the call, determines there is no caller identification, and sends a text message to the telephony device in a text message protocol in the first data path, requesting identification data.

8. The system of claim 7 wherein the protocol other than the voice-carrying protocol is SMS protocol.

9. The system of claim 6 wherein the cellular appliance is configured to automatically reply with identification data in the SMS protocol to the server upon receiving the SMS message from the server.

10. The system of claim 1 wherein the server, upon identifying the caller, accesses additional data about the caller from a source other than the call or the caller, adds the additional data to a message in a text message protocol in the first data path, and routes the call and the message to a destination, with association between the call and the text message.

11. The system of claim 10 wherein the text message protocol is one of one of Short Message Service (SMS), email, Instant Messaging (IM) service, or Session Initiation Protocol (SIP).

12. The system of claim 11 wherein the destination is a communication center, and the call and the message are routed to an agent at the communication center.

13. The system of claim 12 wherein the call is connected to the agent after the message is delivered to the agent.

14. A method for routing a cellular telephone call, comprising the steps of:
    (a) receiving the cellular telephone call at a server including voice data in a voice-carrying protocol over a first data path, the server executing software processing and routing the call;
    (b) sending one or more text messages in at least one text message protocol by the server to the routing destination, over a second data path including voice data in the voice carrying protocol, the text message identifying the caller and including information about one or both of the call or the caller;
    (c) in an instance there is no identification for the caller available with the cellular telephone call received at the server, sending a text message in at least one text message protocol over the first data path to the cellular telephone requesting at least identification information; and
    (d) receiving a text message in at least one text message protocol over the first data path from the caller including the identification information.

15. The method of claim 14 wherein the messages are sent in one of Short Message Service (SMS), email, Instant Messaging (IM) service, or Session Initiation Protocol (SIP).

16. The method of claim 14 wherein the server, receiving the cellular telephone call, receives a text message in the text message protocol over the first data path including voice data in the voice-carrying protocol from the caller identifying the caller.

17. The method of claim 16 wherein the text message in the text message protocol is a SMS message.

18. The method of claim 16 wherein the server routes both the voice data of the call and the text message comprising information about the call or the caller to a destination over the second data path, the text message in a text message protocol, and the call and the message are associated.

19. The method of claim 18 wherein the text message protocol is one of Short Message Service (SMS), email, Instant Messaging (IM) service, or Session Initiation Protocol (SIP).

20. The method of claim 14 wherein the server, receiving a cellular call, determines there is no caller identification, and sends a text message to the cellular telephony device in the text message protocol, over the first data path requesting identification data.

21. The method of claim 20 wherein the text message protocol is SMS protocol.

22. The method of claim 21 wherein the appliance is configured to automatically reply with identification data in the SMS protocol to the server upon receiving the SMS request from the server.

23. The method of claim 14 wherein the server, upon identifying the caller, accesses additional data about the caller from a source other than the call or the caller, adds the additional data to a text message in at least one text message protocol, and routes the call and the message to a destination over the second data path, with association between the call and the message.

24. The method of claim 23 wherein the text message protocol other than the voice-carrying protocol is one of one of Short Message Service (SMS), email, Instant Messaging (IM) service, or Session Initiation Protocol (SIP).

25. The method of claim 24 wherein the destination is a communication center, and the call and the message are routed to an agent at the communication center.

26. The method of claim 25 wherein the call is connected to the agent after the message is delivered to the agent.

* * * * *